US012638721B1

(12) United States Patent
Hsu et al.

(10) Patent No.: US 12,638,721 B1
(45) Date of Patent: May 26, 2026

(54) REFLECTIVE DISPLAY DEVICE

(71) Applicant: HannStar Display Corporation, Taipei City (TW)

(72) Inventors: Chun-Ming Hsu, Taipei City (TW); Yen-Chung Chen, Taipei City (TW); Chia Jung Wu, Taipei City (TW); Chao-Yun Wu, Taipei City (TW); Wei-Chih Hsu, Taipei City (TW)

(73) Assignee: HannStar Display Corporation, Taipei City (TW)

( * ) Notice: Subject to any disclaimer, the term of this patent is extended or adjusted under 35 U.S.C. 154(b) by 0 days.

(21) Appl. No.: 19/070,416

(22) Filed: Mar. 4, 2025

(51) Int. Cl.
*G02F 1/1335* (2006.01)
*F21V 8/00* (2006.01)
*G02F 1/13357* (2006.01)

(52) U.S. Cl.
CPC ..... *G02F 1/133616* (2021.01); *G02B 6/0043* (2013.01); *G02B 6/005* (2013.01); *G02F 1/133507* (2021.01); *G02F 1/133528* (2013.01); *G02F 1/13362* (2013.01); *G02F 1/133504* (2013.01); *G02F 1/133607* (2021.01); *G02F 2203/02* (2013.01)

(58) Field of Classification Search
CPC .......................... G02B 6/0088; G02F 1/133616
See application file for complete search history.

(56) References Cited

U.S. PATENT DOCUMENTS

| | | | |
|---|---|---|---|
| 2015/0003104 A1* | 1/2015 | Huang | ... G02B 6/005 |
| | | | 362/613 |
| 2018/0239188 A1* | 8/2018 | Tamaki | ... G02F 1/133504 |
| 2022/0082879 A1 | 3/2022 | Wang et al. | |
| 2022/0179261 A1* | 6/2022 | Lin | ... G02F 1/133553 |
| 2024/0126000 A1* | 4/2024 | Tan | ... G02B 6/0036 |

FOREIGN PATENT DOCUMENTS

| | | |
|---|---|---|
| CN | 114200722 | 3/2022 |
| CN | 115685602 | 2/2023 |

\* cited by examiner

*Primary Examiner* — Keith G. Delahoussaye
(74) *Attorney, Agent, or Firm* — JCIPRNET

(57) ABSTRACT

A reflective display device including a reflective display panel, a front light module, a first polarizer, at least one light control film and a transparent display panel is provided. The front light module is disposed on one side of the reflective display panel and includes a light guide plate and a light source. The first polarizer is disposed between the light guide plate and the reflective display panel. The at least one light control film is disposed between the reflective display panel and the transparent display panel. Each of the at least one light control film includes a plurality of first periodic structures and a plurality of second periodic structures alternately arranged along at least one direction parallel to a second surface of the light guide plate. A refractive index of the plurality of first periodic structures is different from a refractive index of the plurality of second periodic structures.

14 Claims, 9 Drawing Sheets

152   151

150

152"   151"

150"

REFLECTIVE DISPLAY DEVICE

BACKGROUND

Technical Field

The disclosure relates to a display device, and more particularly, to a reflective display device.

Description of Related Art

Reflective display devices primarily use ambient light as a light source for display. Therefore, they are commonly used outdoor or in well-lit environments, such as outdoor billboards, electronic tags, sports watches, etc. However, the color saturation of reflective display device is generally poor due to the ambient light has to pass through the polarizer twice before imaging or insufficient ambient light. To solve the problem, a traditional method is to add a front light module and a transparent display panel in front of the reflective display panel. However, the reflective display device still has the problems such as insufficient brightness at large viewing angles and blurred display.

SUMMARY

The disclosure provides a reflective display device with better brightness and display quality at large viewing angles.

A reflective display device in the disclosure includes a reflective display panel, a front light module, a first polarizer, at least one light control film and a transparent display panel. The reflective display panel has a display surface. The front light module is disposed on one side of the display surface of the reflective display panel and includes a light guide plate and a light source. The light guide plate has a light incident surface, a first surface and a second surface. The first surface and the second surface are connected to the light incident surface and are opposite to each other. The first surface faces the display surface of the reflective display panel. A light source is disposed on one side of the light incident surface of the light guide plate. The first polarizer is disposed between the light guide plate and the reflective display panel. Each of the at least one light control film includes a plurality of first periodic structures and a plurality of second periodic structures alternately arranged along at least one direction parallel to the second surface of the light guide plate. A refractive index of the plurality of first periodic structures is different from a refractive index of the plurality of second periodic structures. The transparent display panel is disposed on one side of the second surface of the light guide plate. The at least one light control film is disposed between the reflective display panel and the transparent display panel.

In an embodiment of the disclosure, a sidewall of each of the plurality of first periodic structures and the plurality of second periodic structures of the reflective display device is perpendicular to the second surface of the light guide plate.

In an embodiment of the disclosure, a sidewall of each of the plurality of first periodic structures and the plurality of second periodic structures of the reflective display device is not perpendicular and not parallel to the second surface of the light guide plate.

In an embodiment of the disclosure, the at least one light control of the reflective display device includes a first light control film and a second light control film. The sidewalls of the plurality of first periodic structures and the plurality of second periodic structures of the first light control film are inclined in a first tilt direction. The sidewalls of the plurality of first periodic structures and the plurality of second periodic structures of the second light control film are inclined in a second tilt direction. The second tilt direction is anti-parallel to the first tilt direction.

In an embodiment of the disclosure, the plurality of first periodic structures and the plurality of second periodic structures of the reflective display device are alternately arranged along a first direction and a second direction perpendicular to each other and parallel to the second surface of the light guide plate.

In an embodiment of the disclosure, the reflective display device further includes a first adhesive layer disposed between the light guide plate and the transparent display panel.

In an embodiment of the disclosure, the at least one light control film of the reflective display device is located between the transparent display panel and the light guide plate. The first adhesive layer is directly connected to the light guide plate and the at least one light control film.

In an embodiment of the disclosure, the reflective display device further includes a second adhesive layer connected to the light guide plate and the first polarizer.

In an embodiment of the disclosure, an air gap is provided between the light guide plate and the first polarizer of the reflective display device.

In an embodiment of the disclosure, the reflective display device further includes a third polarizer disposed between the transparent display panel and the light guide plate.

In an embodiment of the disclosure, the reflective display device further includes at least one compensation film disposed between the first polarizer and the reflective display panel.

In an embodiment of the disclosure, the reflective display device further includes a second polarizer disposed on one side of the second surface of the light guide plate. The transparent display panel is located between the light guide plate and the second polarizer.

In an embodiment of the disclosure, the reflective display device further includes at least one compensation film disposed between the second polarizer and the transparent display panel.

In an embodiment of the disclosure, the reflective display device further includes a touch module disposed on one side of the second polarizer facing away from the transparent display panel.

In an embodiment of the disclosure, the reflective display device further includes an adhesive layer connected to the second polarizer and the touch module.

In an embodiment of the disclosure, the front light module of the reflective display device further includes a plurality of optical microstructures disposed on the second surface.

Based on the above, in a reflective display device according to an embodiment of the disclosure, a front light module disposed between a reflective display panel and a transparent display panel is configured to be an auxiliary light source when the ambient light is insufficient. Through the configuration of at least one light control film between the reflective display panel and the transparent display panel, the brightness of the reflective display device at large viewing angles may be effectively enhanced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
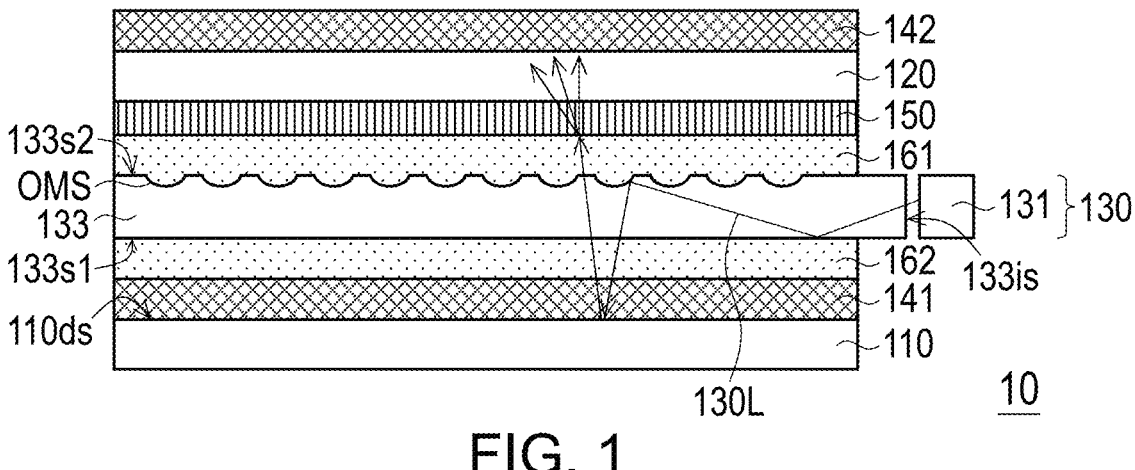
FIG. 1 is a schematic cross-sectional view of a reflective display device according to a first embodiment of the disclosure.

Exemplary embodiments of the disclosure are now described in detail with reference to the accompanying drawings. Wherever possible, the same reference numerals are used in the drawings and the description to refer to the same or similar parts.

Figure 2:
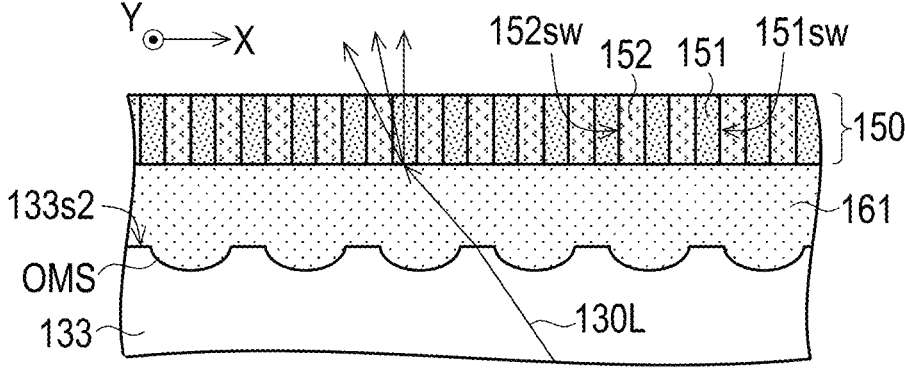
FIG. 2 is an enlarged schematic diagram of a partial area of the reflective display device of FIG. 1.
Figure 3A:
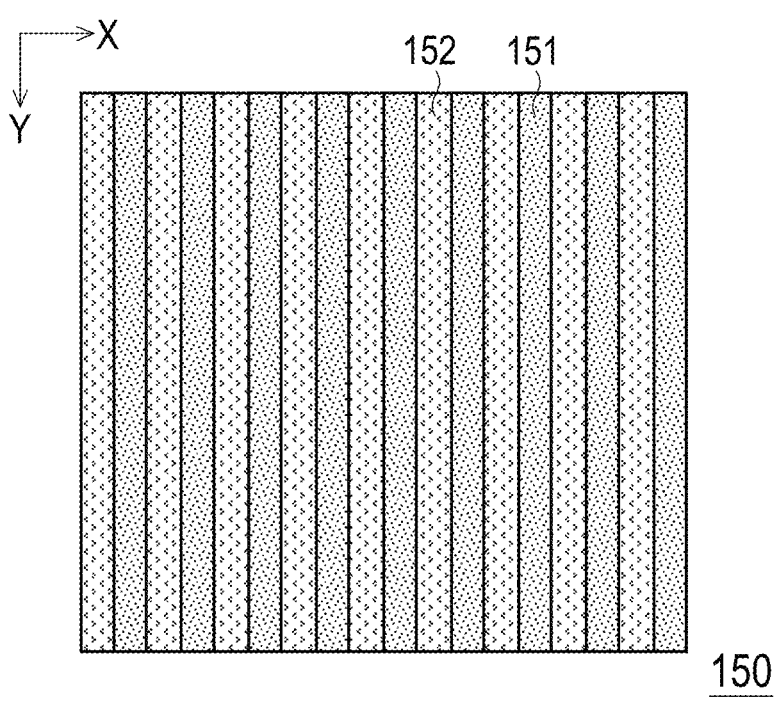
FIG. 3A is a schematic top-view of the light control film of FIG. 1.
Figure 3B:
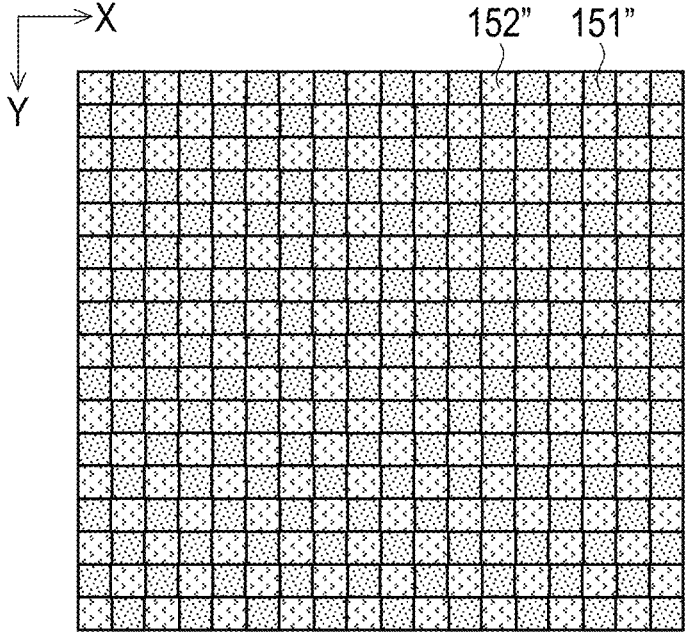
FIG. 3B is a schematic top-view of a modified embodiment of the light control film of FIG. 1.
Figure 4:
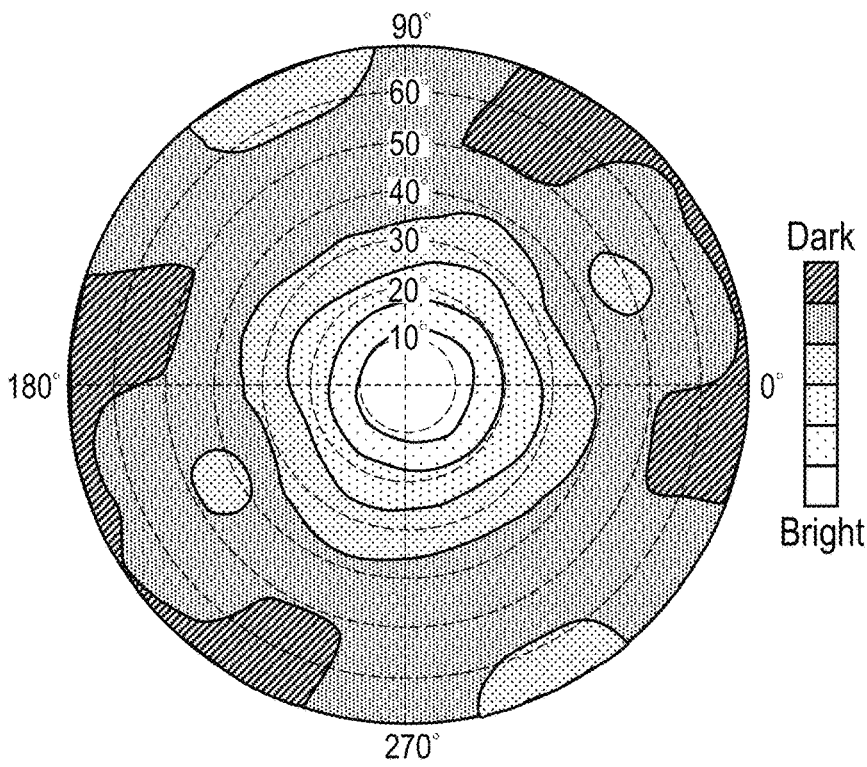
FIG. 4 is a brightness distribution diagram of a front light module in FIG. 1.
Figure 5:
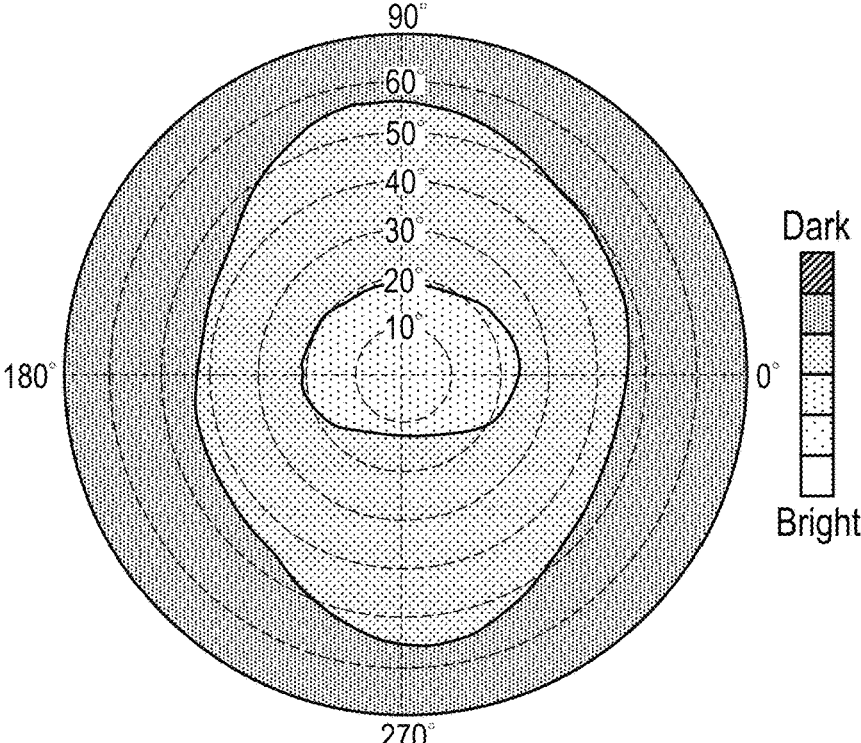
FIG. 5 is a brightness distribution diagram of a front light module overlapped with a light control film in FIG. 1.
Figure 6:
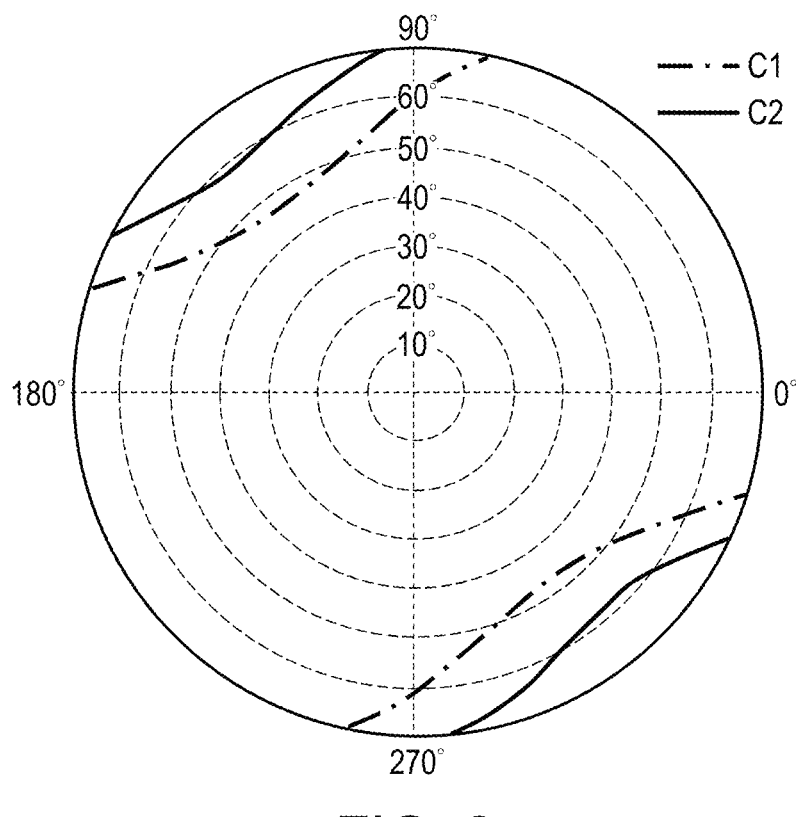
FIG. 6 is a brightness distribution diagram of partial film layers of the reflective display device of FIG. 1.
Figure 7:
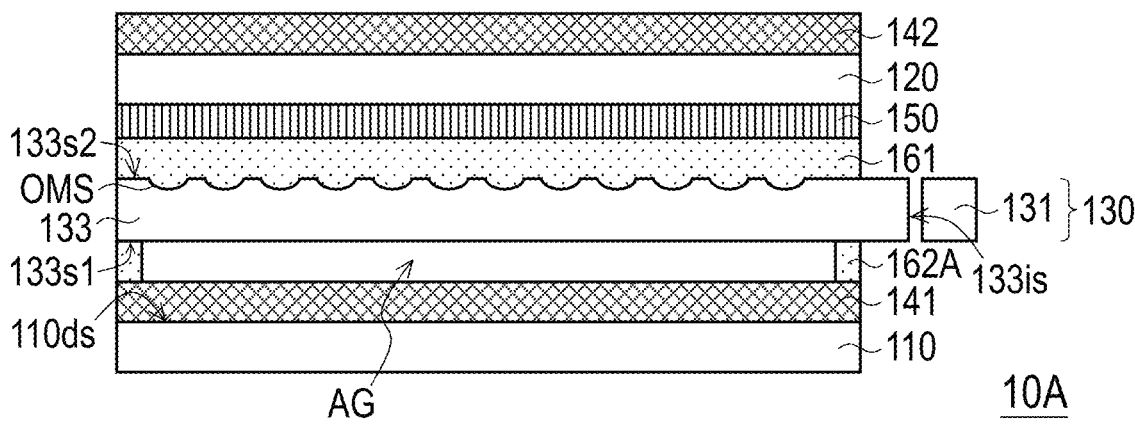
FIG. 7 is a schematic cross-sectional view of a modified embodiment of the reflective display device of FIG. 1.
Figure 8A:
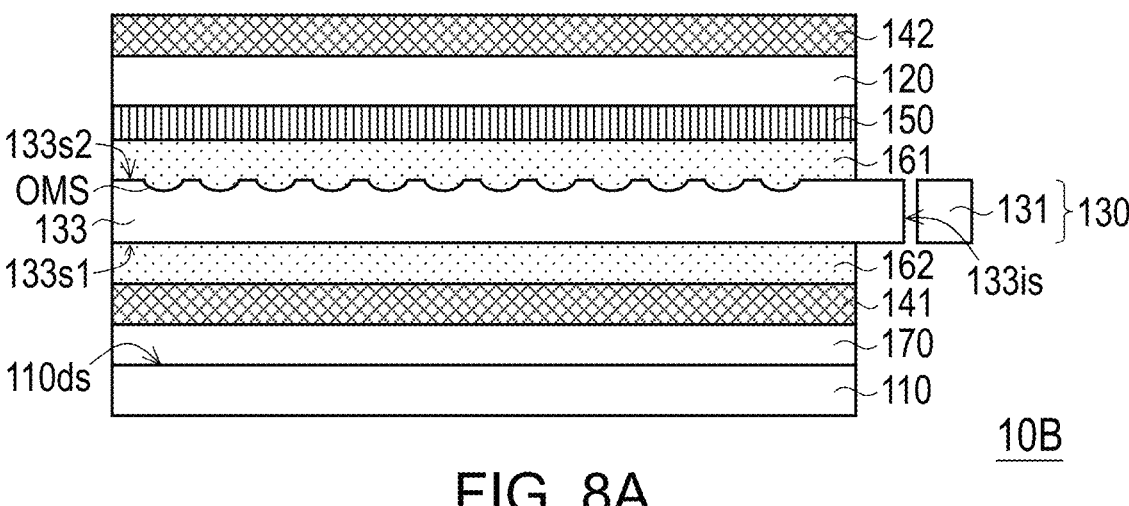
FIG. 8A and FIG. 8B are schematic cross-sectional views of another modified embodiments of the reflective display device of FIG. 1.
Figure 8B:
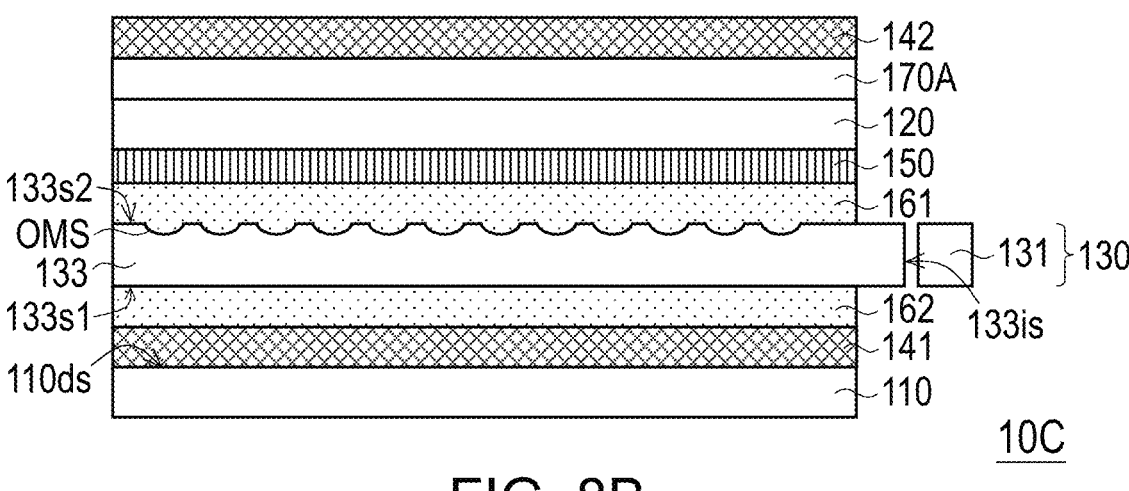

FIG. 1 is a schematic cross-sectional view of a reflective display device according to a first embodiment of the disclosure. FIG. 2 is an enlarged schematic diagram of a partial area of the reflective display device of FIG. 1. FIG. 3A is a schematic top-view of the light control film of FIG. 1. FIG. 3B is a schematic top-view of a modified embodiment of the light control film of FIG. 1. FIG. 4 is a brightness distribution diagram of a front light module in FIG. 1. FIG. 5 is a brightness distribution diagram of a front light module overlapped with a light control film in FIG. 1. FIG. 6 is a brightness distribution diagram of partial film layers of the reflective display device of FIG. 1. FIG. 7 is a schematic cross-sectional view of a modified embodiment of the reflective display device of FIG. 1. FIG. 8A and FIG. 8B are schematic cross-sectional views of another modified embodiments of the reflective display device of FIG. 1.

Referring to FIG. 1 and FIG. 2, A reflective display device 10 includes a reflective display panel 110, a transparent display panel 120 and a front light module 130. The reflective display panel 110 is, for example, a total reflective liquid crystal display panel, and has a display surface 110$ds$. In other embodiment, the reflective display panel 110 may be a transflective liquid crystal display panel. The transparent display panel 120 is, for example, a transparent liquid crystal display panel.

The transparent display panel 120 is disposed on one side of the display surface of the reflective display panel 110. The front light module 130 is disposed between the reflective display panel 110 and the transparent display panel 120. The front light module 130 includes a light source 131 and a light guide plate 133. The light guide plate 133 has a light incident surface 133$is$, a first surface 133$s1$ and a second surface 133$s2$. The first surface 133$s1$ and the second surface 133$s2$ are connected to the light incident surface 133$is$ and are opposite to each other. In the embodiment, the first surface 133$s1$ of the light guide plate 133 faces the display surface 110$ds$ of the reflective display panel 110. The transparent display panel 120 is located on one side of the second surface 133$s2$ of the light guide plate 133.

The front light module 130 is configured to provide illumination for the reflective display panel 110 when the ambient light is insufficient. In other words, the front light module 130 is used as an auxiliary light source. In detail, the light source 131 is disposed facing the light incident surface 133$is$ of the light guide plate 133 so as to emit light 130L toward the light incident surface 133$is$ of the light guide plate 133. In the embodiment, to enhance the light emission efficiency of the light guide plate 133, the second surface 133$s2$ of the light guide plate 133 may be provided with a plurality of optical microstructures OMS. Each optical microstructure OMS is adapted to reflect the light 130L laterally transmitted in the light guide plate 133 to the display surface 110$ds$ of the reflective display panel 110.

In the embodiment, the plurality of optical microstructures OMS are, for example, recessed from the second surface 133$s2$ of the light guide plate 133, but the disclosure is not limited thereto. In other embodiment, the plurality of optical microstructures may be protruded from the second surface 133$s2$ of the light guide plate 133.

Furthermore, the reflective display device 10 further includes a first polarizer 141, a second polarizer 142 and a light control film 150. The first polarizer 141 is disposed between the guide plate 133 and the reflective display panel 110. The second polarizer 142 and the light control film 150 are disposed on one side of the second surface 133$s2$ of the light guide plate 133. The transparent display panel 120 is located between the second polarizer 142 and the light guide plate 133.

The light control film 150 is located between the transparent display panel 120 and the light guide plate 133, and includes a plurality of first periodic structures 151 and a plurality of second periodic structures 152. The plurality of first periodic structures 151 and the plurality of second periodic structures 152 are alternately arranged along at least one direction parallel to the second surface 133$s2$ of the light guide plate 133. In the embodiment, the plurality of first periodic structures 151 and the plurality of second periodic structures 152 are alternately arranged along a direction X, and each extend in a direction Y (as shown in FIG. 3A). The direction X and the direction Y are perpendicular to each other and parallel to the second surface 133$s2$ of the light guide plate 133. However, the disclosure is not limited thereto. In a light control film 150″ of a modified embodiment, the plurality of first periodic structures 151″ and the plurality of second periodic structure 152″ of the light control film 150A may be alternately arranged along the direction X and the direction Y to form a chessboard-like distribution (as shown in FIG. 3B).

A refractive index of the plurality of first periodic structures 151 is different from a refractive index of the plurality of second periodic structures 152. On the other hand, each of the plurality of first periodic structures 151 has a sidewall 151sw, and each of the plurality of second periodic structures 152 has a sidewall 152sw. In the embodiment, the sidewall 151sw and the sidewall 152sw may be perpendicular to the second surface 133s2 of the light guide plate 133, but the disclosure is not limited thereto.

It should be noted that the light control film 150 is suitable for diffusing light 130L to enhance brightness at specific viewing angles or to expand the viewing angle range. FIG. 4 shows a brightness distribution of the front light module 130 in FIG. 1, and FIG. 5 shows a brightness distribution of the front light module 130 overlapped with the light control film 150 in FIG. 1. As shown in FIG. 4 and FIG. 5, the light control film 150 may enhance the brightness at large viewing angles (for example, the viewing angles greater than 50°), thereby expanding the viewing angle range of the reflective display device 10.

FIG. 6 shows a brightness distribution of the reflective display device 10 without the transparent display panel 120 in FIG. 1. Referring to FIG. 1 and FIG. 6, the curve C1 indicates the brightness distribution of a comparative example without the light control film 150 and the transparent display panel 120, the curve C2 indicates the brightness distribution of the reflective display device 10 without the transparent display panel 120. As shown in FIG. 6, the viewing angle range of the reflective display device 10 is expanded through the configuration of the light control film 150. For example, the effective viewing angle of the reflective display device 10 along the directions of azimuth angle 90° and 270° can be expanded from 60° to 70°.

Referring to FIG. 1 and FIG. 2, in the embodiment, the reflective display device 10 may further include an adhesive layer 161 and an adhesive layer 162. The adhesive layer 161 is disposed between the light guide plate 133 and the transparent display panel 120, and is directly connected to the light guide plate 133 and the light control film 150. The adhesive layer 162 is disposed between the light guide plate 133 and the reflective display panel 110, and is directly connected to the light guide plate 133 and the first polarizer 141. The materials of the adhesive layer 161 and the adhesive layer 162 may includes optical clear adhesive (OCA), optical clear resin (OCR), or other suitable optical adhesives.

In the embodiment, the light control film 150 and the first polarizer 141 may be bonded to the light guide plate 133 by direct bonding processes. However, the disclosure is not limited thereto. Referring to FIG. 7, in a modified embodiment of the reflective display device 10, the adhesive layer 162A of a reflective display device 10A may be a double-sided tape. More specifically, the light guide plate 133 is bonded to the first polarizer 141 through an air bonding process. Therefore, an air gap AG is provided between the light guide plate 133 and the first polarizer 141 after the air bonding process.

Referring to FIG. 8A, in another modified embodiment of the reflective display device 10, a reflective display device 10B may further includes at least one compensation film. For example, a compensation film 170 may be disposed between the first polarizer 141 and the reflective display panel 110. However, the disclosure is not limited thereto. In a modified embodiment of the reflective display device 10B of FIG. 8A, the compensation film 170A of a reflective display device 10C may be disposed between the second polarizer 142 and the transparent display panel 120 (as shown in FIG. 8B). The compensation film may be a half-wave plate (HWP), a quarter-wave plate (QWP) or a combination of the above.

It should be understood that the number of the compensation film provided in a reflective display device may be more than one. For example, in other embodiment not shown, a reflective display device may be provided with the compensation film 170 and the compensation film 170A.

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 9:
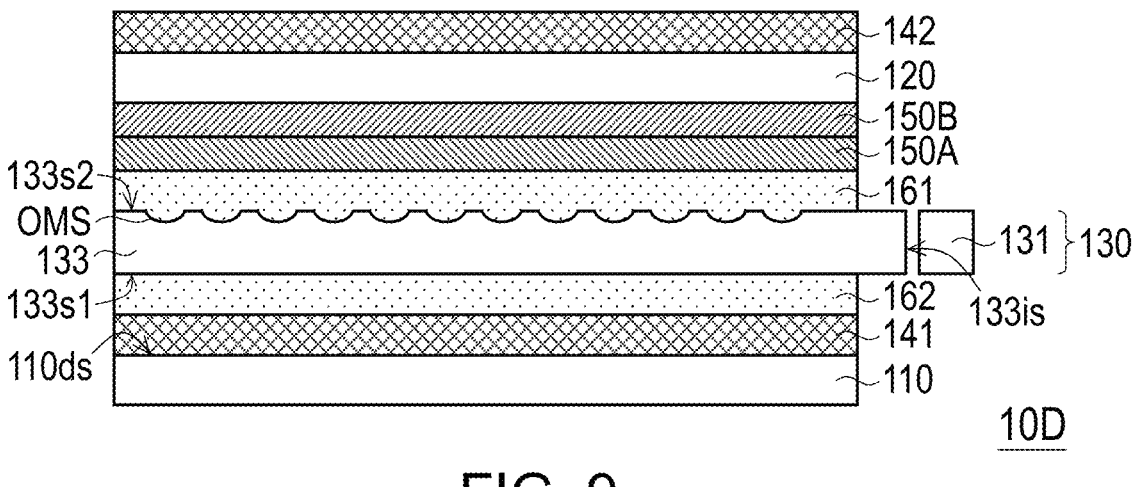
FIG. 9 is a schematic cross-sectional view of a reflective display device according to a second embodiment of the disclosure.
Figure 10:
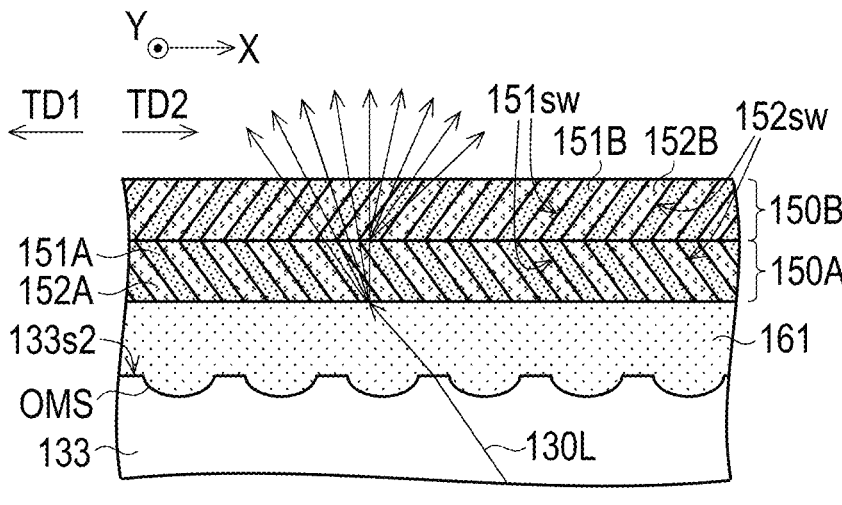
FIG. 10 is an enlarged schematic diagram of a partial area of the reflective display device of FIG. 9.

FIG. 9 is a schematic cross-sectional view of a reflective display device according to a second embodiment of the disclosure. FIG. 10 is an enlarged schematic diagram of a partial area of the reflective display device of FIG. 9. Referring to FIGS. 9 and 10, the difference between a reflective display device 10D of FIG. 9 and the reflective display device 10 of FIG. 1 lies in that the number and configuration of the light control film are different.

In the embodiment, the reflective display device 10D includes two light control films, for example, a light control film 150A and a light control film 150B. It should be noted that the configuration of the plurality of periodic structures of the light control film 150A is different from the configuration of the plurality of periodic structures of the light control film 150B. For example, the sidewalls 151sw of the plurality of first periodic structures 151A and the sidewalls 152sw of the plurality of second periodic structures 152A of the light control film 150A are inclined in a first tilt direction TD1. The sidewalls 151sw of the plurality of first periodic structures 151B and the sidewalls 152sw of the plurality of second periodic structures 152B of the light control film 150B are inclined in a second tilt direction TD2, and the second tilt direction TD2 may be anti-parallel to the first tilt direction TD1.

The light control film 150A and the light control film 150B are suitable for diffusing light 130L in opposite directions. Through the configuration of the light control film 150A and the light control film 150B, the brightness of the reflective display device 10D at larger viewing angles may be enhanced, thereby expanding the viewing angle range of the reflective display device 10D.

However, the disclosure is not limited thereto. In some modified embodiments not shown, the first tilt direction TD1 of the plurality of periodic structures of the light control film 150A may intersect (e.g., perpendicular to) the second tilt direction TD2 of the plurality of periodic structures of the light control film 150B.

Figure 11:
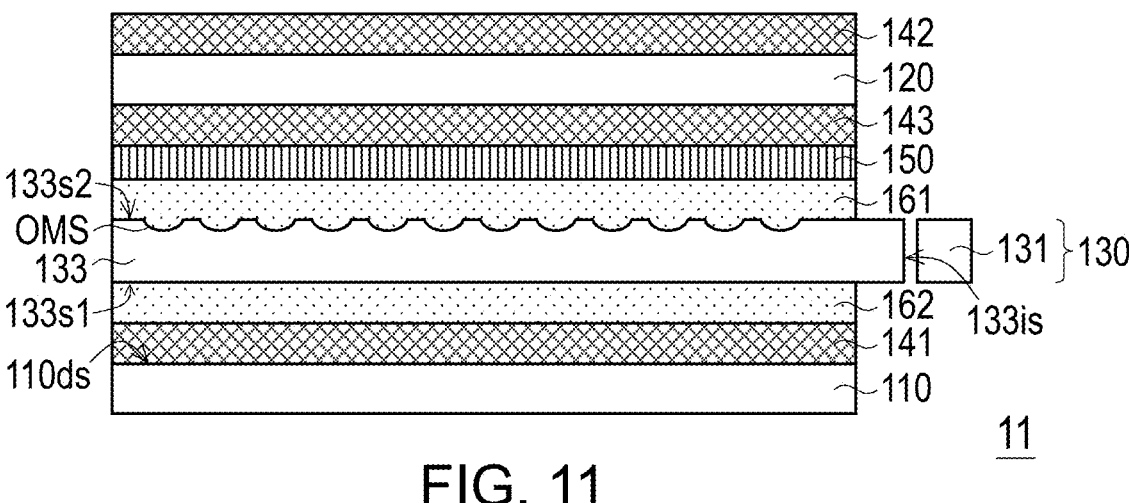
FIG. 11 is a schematic cross-sectional view of a reflective display device according to a third embodiment of the disclosure.
Figure 12:
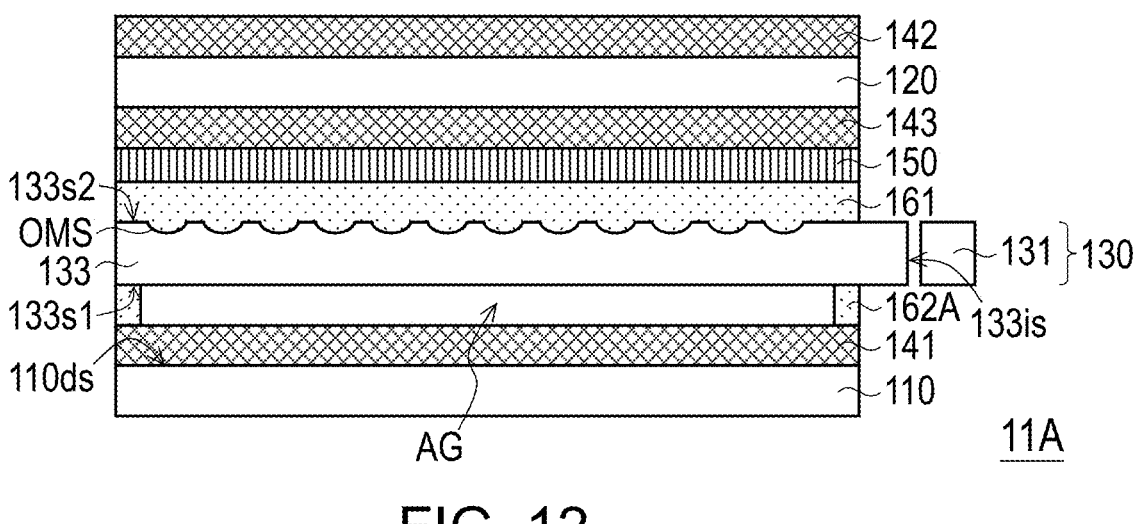
FIG. 12 is a schematic cross-sectional view of a modified embodiment of the reflective display device of FIG. 11.

FIG. 11 is a schematic cross-sectional view of a reflective display device according to a third embodiment of the disclosure. FIG. 12 is a schematic cross-sectional view of a modified embodiment of the reflective display device of FIG. 11. Referring to FIG. 11, compared to the reflective display device 10 of FIG. 1, a reflective display device 11 of the embodiment further includes a third polarizer 143 disposed between the transparent display panel 120 and the light guide plate 133. In the embodiment, the third polarizer 143 may be located between the transparent display panel 120 and the light control film 150, but the disclosure is not limited thereto.

Referring to FIG. 12, in a modified embodiment of the reflective display device 11 of FIG. 11, the adhesive layer 162A of a reflective display device 11A may be a double-sided tape. More specifically, the light guide plate 133 is bonded to the first polarizer 141 through an air bonding process. Therefore, an air gap AG is provided between the light guide plate 133 and the first polarizer 141 after the air bonding process.

Figure 13:
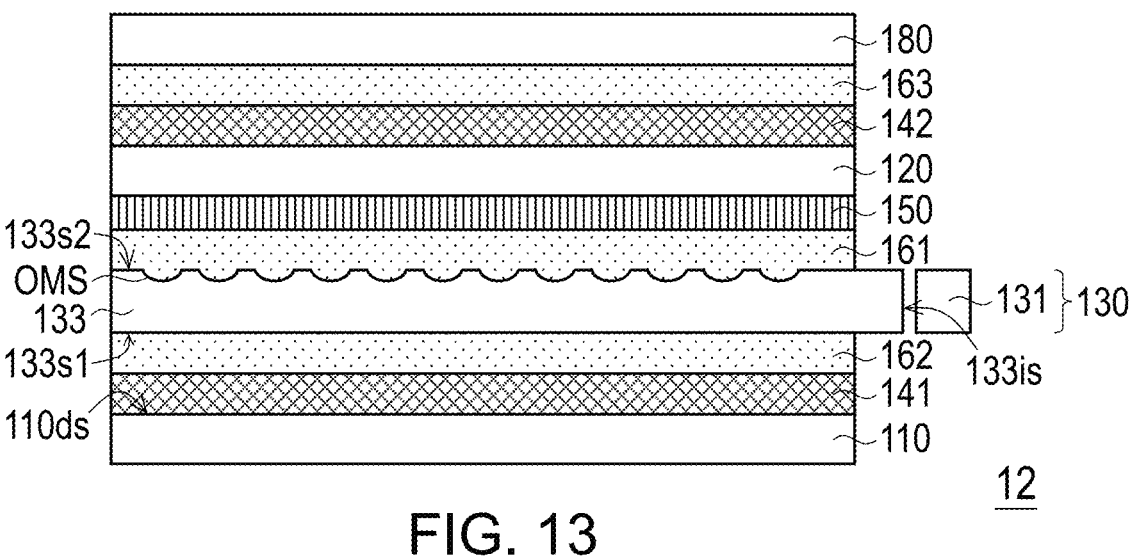
FIG. 13 is a schematic cross-sectional view of a reflective display device according to a fourth embodiment of the disclosure.
Figure 14A:
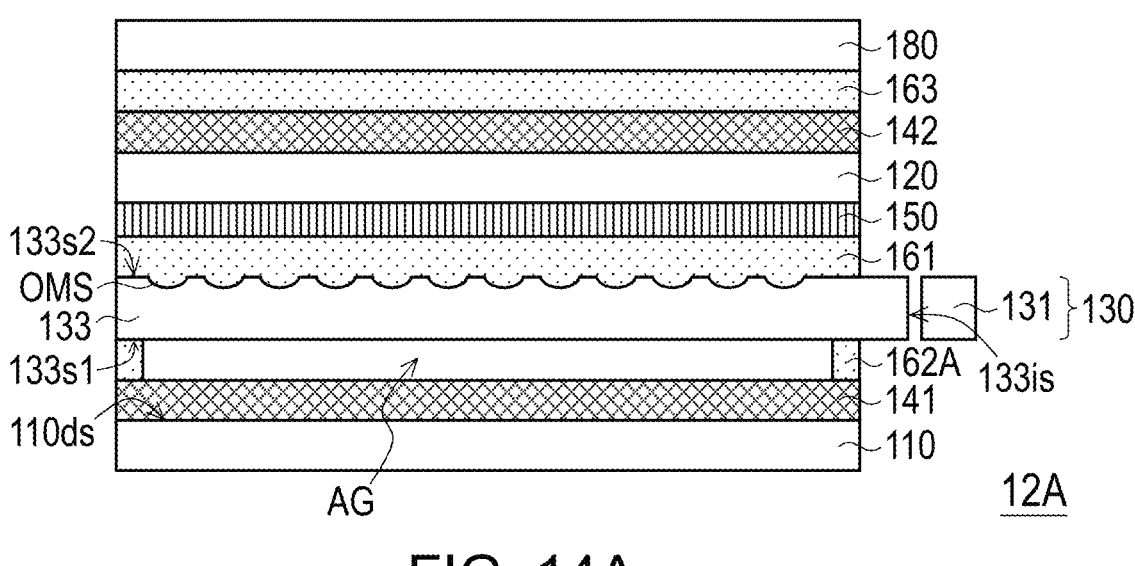
FIGS. 14A to 14C are schematic cross-sectional views of modified embodiments of the reflective display device of FIG. 13.
Figure 14B:
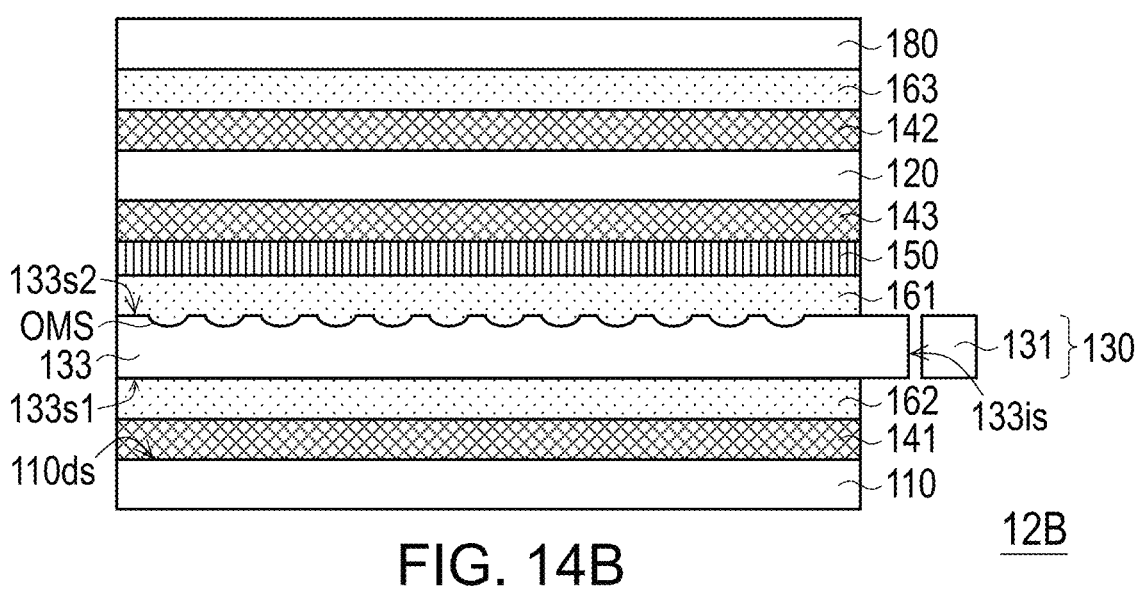
Figure 14C:
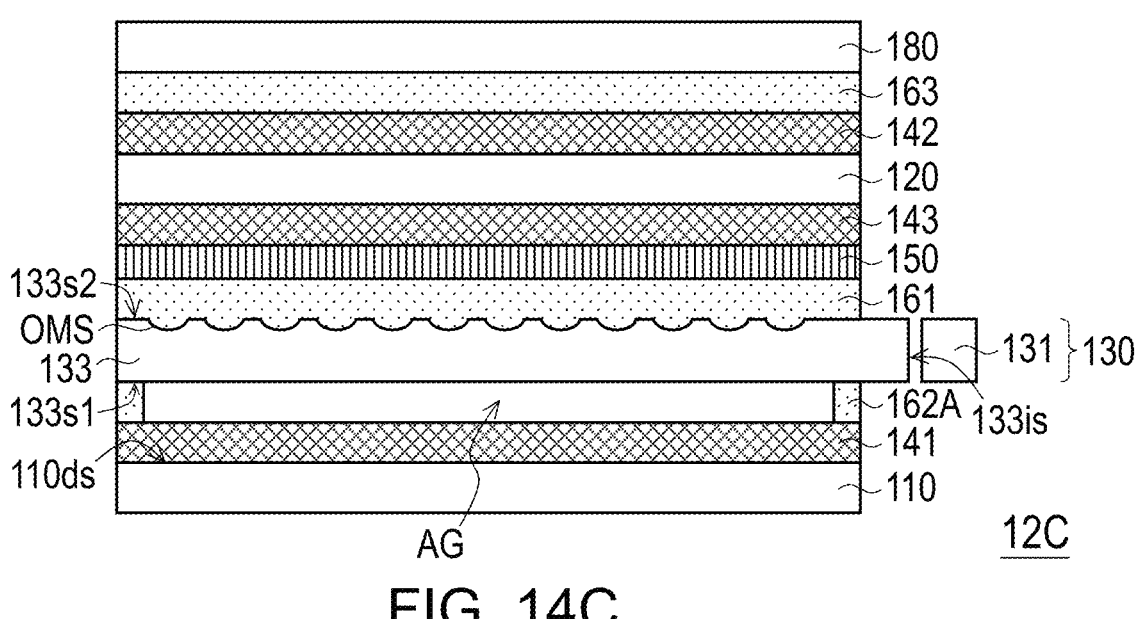

FIG. 13 is a schematic cross-sectional view of a reflective display device according to a fourth embodiment of the disclosure. FIGS. 14A to 14C are schematic cross-sectional views of modified embodiments of the reflective display device of FIG. 13. Referring to FIG. 13, compared to the reflective display device 10 of FIG. 1, a reflective display device 12 of the embodiment may further includes a touch module 180. In the embodiment, the touch module 180 may be disposed on one side of the second polarizer 142 facing away from the transparent display panel 120.

In a modified embodiment of the reflective display device 12, as shown in FIG. 14A, the adhesive layer 162A of a reflective display device 12A may be a double-sided tape. More specifically, the light guide plate 133 is bonded to the first polarizer 141 through an air bonding process. Therefore, an air gap AG is provided between the light guide plate 133 and the first polarizer 141 after the air bonding process.

In another modified embodiment of the reflective display device 12, as shown in FIG. 14B, a reflective display device 12B may further include a third polarizer 143 disposed between the transparent display panel 120 and the light guide plate 133. In the embodiment, the third polarizer 143 may be located between the transparent display panel 120 and the light control film 150, but the disclosure is not limited thereto. In a modified embodiment of the reflective display device 12B of FIG. 14B, as shown in FIG. 14C, the adhesive layer 162A of a reflective display device 12C may be a double-sided tape. More specifically, the light guide plate 133 is bonded to the first polarizer 141 through an air bonding process. Therefore, an air gap AG is provided between the light guide plate 133 and the first polarizer 141 after the air bonding process.

To sum up, in a reflective display device according to an embodiment of the disclosure, a front light module disposed between a reflective display panel and a transparent display panel is configured to be an auxiliary light source when the ambient light is insufficient. Through the configuration of at least one light control film between the reflective display panel and the transparent display panel, the brightness of the reflective display device at large viewing angles may be effectively enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A reflective display device, comprising:
a reflective display panel, having a display surface;
a front light module, disposed on one side of the display surface of the reflective display panel, and comprising:
a light guide plate, having a light incident surface, a first surface and a second surface, wherein the first surface and the second surface are connected to the light incident surface and are opposite to each other, and the first surface faces the display surface of the reflective display panel; and

a light source, disposed on one side of the light incident surface of the light guide plate;
a first polarizer, disposed between the light guide plate and the reflective display panel;
at least one light control film, each comprising:
a plurality of first periodic structures and a plurality of second periodic structures, alternately arranged along at least one direction parallel to the second surface of the light guide plate, wherein a refractive index of the plurality of first periodic structures is different from a refractive index of the plurality of second periodic structures;
a transparent display panel, disposed on one side of the second surface of the light guide plate, wherein the at least one light control film is disposed between the reflective display panel and the transparent display panel; and
a first adhesive layer, disposed between the light guide plate and the transparent display panel, wherein the at least one light control film is located between the transparent display panel and the light guide plate, and the first adhesive layer is directly connected to the light guide plate and the at least one light control film.

2. The reflective display device according to claim 1, wherein a sidewall of each of the plurality of first periodic structures and the plurality of second periodic structures is perpendicular to the second surface of the light guide plate.

3. The reflective display device according to claim 1, wherein a sidewall of each of the plurality of first periodic structures and the plurality of second periodic structures is not perpendicular and not parallel to the second surface of the light guide plate.

4. The reflective display device according to claim 3, wherein the at least one light control film includes a first light control film and a second light control film, the sidewalls of the plurality of first periodic structures and the plurality of second periodic structures of the first light control film are inclined in a first tilt direction, the sidewalls of the plurality of first periodic structures and the plurality of second periodic structures of the second light control film are inclined in a second tilt direction, and the second tilt direction is anti-parallel to the first tilt direction.

5. The reflective display device according to claim 1, wherein the plurality of first periodic structures and the plurality of second periodic structures are alternately arranged along a first direction and a second direction perpendicular to each other and parallel to the second surface of the light guide plate.

6. The reflective display device according to claim 1, further comprising:
a second adhesive layer, connected to the light guide plate and the first polarizer.

7. The reflective display device according to claim 1, wherein an air gap is provided between the light guide plate and the first polarizer.

8. The reflective display device according to claim 1, further comprising:
a third polarizer, disposed between the transparent display panel and the light guide plate.

9. The reflective display device according to claim 1, further comprising:
at least one compensation film, disposed between the first polarizer and the reflective display panel.

10. A reflective display device, comprising:
a reflective display panel, having a display surface;
a front light module, disposed on one side of the display surface of the reflective display panel, and comprising:

a light guide plate, having a light incident surface, a first surface and a second surface, wherein the first surface and the second surface are connected to the light incident surface and are opposite to each other, and the first surface faces the display surface of the reflective display panel; and a light source, disposed on one side of the light incident surface of the light guide plate;

a first polarizer, disposed between the light guide plate and the reflective display panel;

at least one light control film, each comprising:

a plurality of first periodic structures and a plurality of second periodic structures, alternately arranged along at least one direction parallel to the second surface of the light guide plate, wherein a refractive index of the plurality of first periodic structures is different from a refractive index of the plurality of second periodic structures;

a transparent display panel, disposed on one side of the second surface of the light guide plate, wherein the at least one light control film is disposed between the reflective display panel and the transparent display panel; and a second polarizer, disposed on one side of the second surface of the light guide plate, wherein the transparent display panel is located between the light guide plate and the second polarizer.

11. The reflective display device according to claim 10, further comprising:

at least one compensation film, disposed between the second polarizer and the transparent display panel.

12. The reflective display device according to claim 10, further comprising:

a touch module, disposed on one side of the second polarizer facing away from the transparent display panel.

13. The reflective display device according to claim 12, further comprising:

an adhesive layer, connected to the second polarizer and the touch module.

14. The reflective display device according to claim 1, wherein the front light module further comprises a plurality of optical microstructures disposed on the second surface.

* * * * *